(Model.)
E. F. JOHNSON.
FIRE GRATE.
No. 267,896. Patented Nov. 21, 1882.
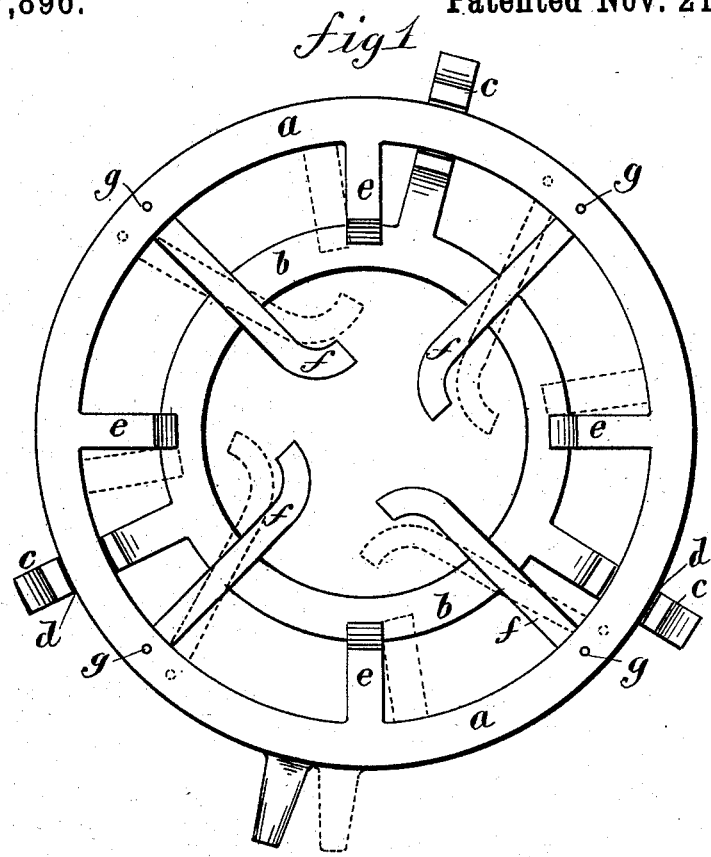
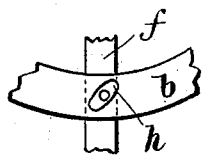
WITNESSES:
INVENTOR: E. F. Johnson
BY Munn & Co.
ATTORNEYS.

UNITED STATES PATENT OFFICE.

EDWARD F. JOHNSON, OF TROY, PENNSYLVANIA.

FIRE-GRATE.

SPECIFICATION forming part of Letters Patent No. 267,896, dated November 21, 1882.

Application filed August 30, 1882. (Model.)

*To all whom it may concern:*

Be it known that I, EDWARD F. JOHNSON, of Troy, in the county of Bradford and State of Pennsylvania, have invented a new and Improved Fire-Grate, of which the following is a full, clear, and exact description.

This invention relates to an improvement in fire-grates, having for its object to stir the fire and open up a space at its center to allow the discharge or escape of pieces of slate and clinkers; and the nature of the invention consists in the employment of curved radial arms pivoted to the grate, and having pins moving in oblique slots or apertures in the grate-supporting frame, substantially as hereinafter more fully set forth and claimed.

Reference is to be had to the accompanying drawings, forming part of this specification, in which similar letters of reference indicate corresponding parts in all the figures.

Figure 1 is a plan view of a stove or furnace grate constructed according to my invention. Fig. 2 is a detail of Fig. 1 in plan view inverted.

The grate $a$ and the frame $b$ for the support of the grate are of the usual form, the frame having the arms $c$, by which it is supported upon the furnace-walls, and upon which the grate $a$ is supported in notches $d$, said frame also supporting the arms $e$ of the grate. I propose to apply radial arms $f$ to the grate $a$ and the frame $b$, as shown—that is to say, by pivots $g$, connecting them to the grate, and also pivoting them to the frame $b$ by means of pivots projecting up from the said arms $f$ and passing through oblique slots or apertures $h$ in the said frame $b$, as seen in Fig. 2, so that when the grate is shaken the inner ends of the arms will have a kind of poker motion that will break up clinkers and sift them through the grate, and by further turning the grate will open a space that will allow large pieces to fall.

Having thus fully described my invention, I claim as new and desire to secure by Letters Patent—

The combination, with the grate $a$ and the frame $b$, of the curved radial arms $f$, pivoted to the grate, and having oblique slots or apertures $h$, which receive projections or pivots of the arms, as shown and described, and for the purpose set forth.

EDWARD F. JOHNSON.

Witnesses:
D. MITCHELL,
C. E. RAMAGE.